United States Patent [19]
Krewson, Jr.

[11] Patent Number: 5,502,916
[45] Date of Patent: Apr. 2, 1996

[54] ROD MOUNTED LURE CASE

[76] Inventor: Thomas D. Krewson, Jr., 1650 S. Main St., Belle Glade, Fla. 33420

[21] Appl. No.: 259,067

[22] Filed: Jun. 13, 1994

[51] Int. Cl.⁶ .................................................. A01K 87/00
[52] U.S. Cl. .............................................. 43/25.2; 43/57.1
[58] Field of Search ........................... 43/25.2, 26, 54.1, 43/57.1; 206/315.11, 315.1

[56] References Cited

U.S. PATENT DOCUMENTS

| | | | |
|---|---|---|---|
| 2,767,502 | 10/1956 | Reynolds | 43/25.2 |
| 2,993,293 | 7/1961 | Blout | 43/25.2 |
| 3,199,243 | 8/1965 | Caston | 43/57.1 |
| 3,484,980 | 12/1967 | Wait | 43/25.2 |
| 4,203,245 | 5/1980 | Peterson | 43/57.1 |
| 4,216,604 | 8/1980 | Starke | 43/25.2 |
| 4,452,003 | 6/1984 | Deutsch et al. | 43/57.1 |
| 4,681,220 | 7/1987 | Beneke | 43/25.2 |
| 4,920,683 | 5/1990 | Weber | 43/25.2 |
| 4,944,111 | 7/1990 | Daniel | 43/25.2 |
| 5,235,775 | 8/1993 | Daughtry | 43/25.2 |

Primary Examiner—P. Austin Bradley
Assistant Examiner—Chuck Y. Mah
Attorney, Agent, or Firm—Charles E. Baxley

[57] ABSTRACT

An apparatus for storing fishing lures includes two generally symmetrical portions which are joined by a hinge portion. Each of the portions includes a semi-cylindrical cavity portion and a semi-tubular portion and a locking member. When the two symmetrical portions are folded together, the two semi-cylindrical portions form a case in which a fishing lure can be stored in a safe manner. The two semi-tubular portions form a complete tube which enables the apparatus to be mounted on a fishing rod.

11 Claims, 3 Drawing Sheets

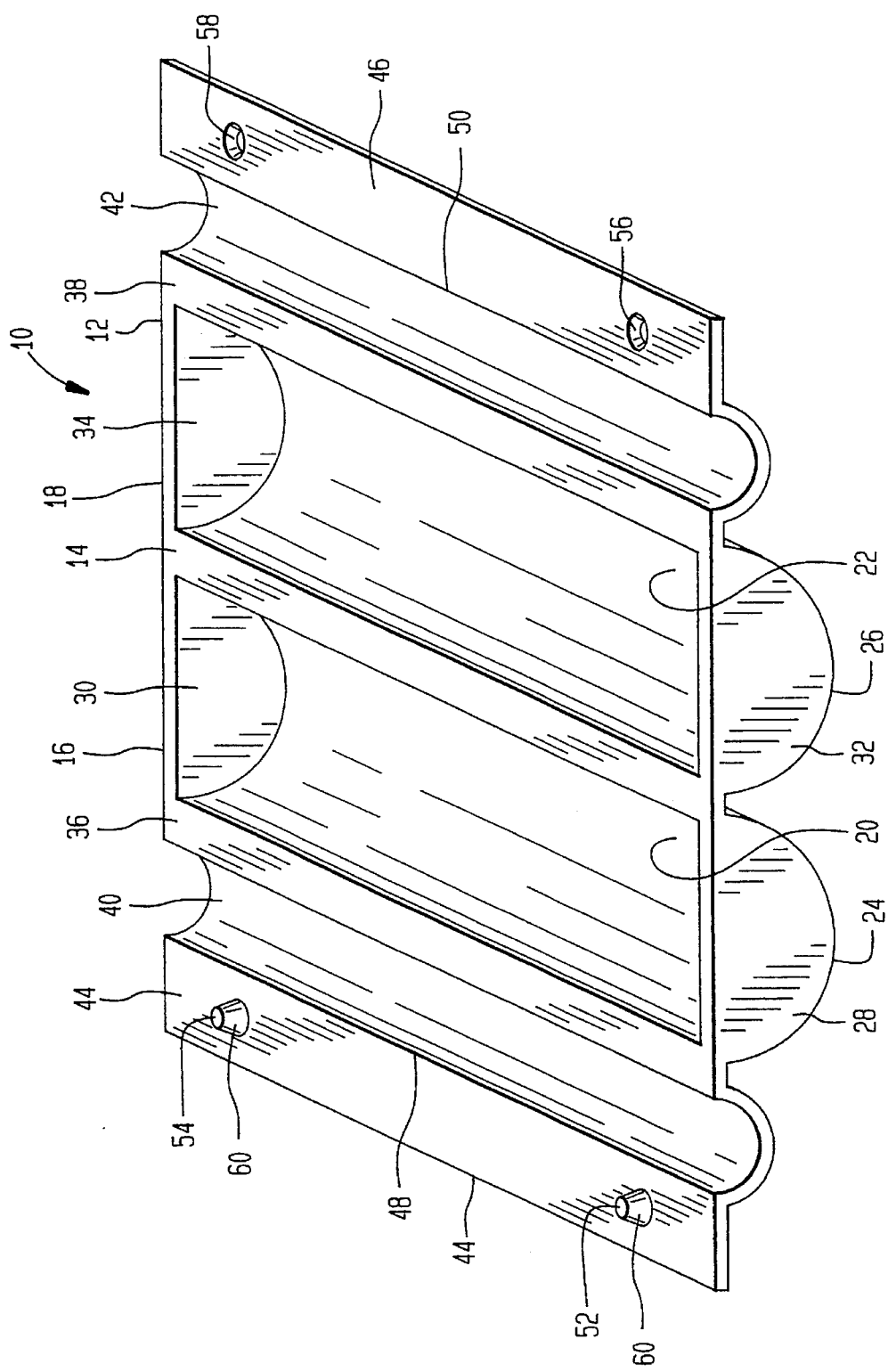

ROD MOUNTED LURE CASE

BACKGROUND OF THE INVENTION

The present invention relates generally to the field of fishing apparatus and, more particularly, to a rod mounted lure case.

THE PRIOR ART

The prior art related to apparatus which can be mounted on a fishing rod for the protection and storage of a fishing lure includes the following apparatuses:

U.S. Pat. No. 2,767,502 to R. R. Reynolds shows a molded box which has a hinged cover. The walls of the box and the cover have cutouts which fit around a fishing rod and the fishing line. A pair of pivoting hooks are provided to hold the box onto the fishing rod.

U.S. Pat. No. 2,993,293 to J. J. Blout shows a pod which has a split opening and which encloses a fish hook and releasably engages the fish hook. The pod is made of synthetic resin material so that the pod can be sprung open to insert the fish hook with the pod then springing back to enclose the fish hook. A split tubular sleeve is incorporated to grip the fishing rod.

U.S. Pat. No. 3,484,980 to W. H. Wait shows a cylindrical container which includes an open end and a closed end and which is mounted on a fishing rod by means of a spring clip. The closed end includes a permanent magnet which holds the fishing hook inside the container.

U.S. Pat. No. 4,203,245 to J. B. Peterson shows a holder which is formed by a rectangular sheet of plastic which includes a strip of VELCRO® which enables the sheet to be formed around a fishing lure. A channel shaped clip is connected or heat sealed along one edge of the rectangular sheet to allow the sheet to be clipped onto a fishing rod.

U.S. Pat. No. No. 4,920,683 to J. L. Weber shows a cylindrical holder molded of a semi-rigid plastic material which has semicircular end walls each having recesses which define aligned holes when the holder is closed. The aligned holes allow the holder to be mounted on a fishing rod. The holder is formed as two semi-cylindrical sections which are connected by a latch member.

U.S. Pat. No. 5,235,775 to D. A. Daughtry shows a holder which includes a pair of concave enclosure members. The enclosure members are removably located together by a pair of locking members which are generally "S"-shaped. The "S"-shaped members, when locked together, form an opening which locks the holder onto a fishing pole.

All of the apparatuses in the prior art are relatively complex in construction and require relatively complex tooling for manufacture.

OBJECTS AND SUMMARY OF THE INVENTION

It is an object of the present invention to provide a rod mounted lure case which is capable of easily mounting onto a fishing rod.

Another object of the present invention is to provide a rod mounted lure case which can be easily molded of inexpensive plastic resulting in a low overall cost.

Another object of the present invention is to provide a rod mounted lure case which can be easily mounted onto and removed from a fishing rod.

Another object of the present invention is to provide a rod mounted lure case which can be manufactured inexpensively using a vacuum forming process which requires relatively low tooling costs.

Yet another object of the present invention is to provide a rod mounted lure case which can be easily cleaned after each use.

The foregoing and other objects and advantages of the present invention will appear more fully hereinafter.

In accordance with the present invention, there is provided a rod mounted lure case which is formed of sheet plastic with a living hinge joining two generally symmetrical portions to allow the two portions to fold around and lock onto a fishing rod.

Each of the two portions includes a semi-cylindrical cavity portion, a semi-tubular member and a locking member. When the two portions are folded and locked together, the two semi-cylindrical cavity portions form a case in which a fishing lure may be stored in a safe yet easily accessible manner. When the two portions are folded together, the two semi-tubular portions form a complete tube which encircles the fishing rod and allows the apparatus to lock onto the fishing rod.

The apparatus is preferably made of a transparent washable plastic sheet which is formed by a vacuum forming process, thereby resulting in efficient manufacture combined with relatively low tooling costs.

BRIEF DESCRIPTION OF THE DRAWINGS

Other important objects and advantages of the present invention will be apparent from the following detailed description taken in conjunction with the accompanying drawings in which:

FIG. 4 is a perspective view of the rod mounted lure case with the lure case shown removed from the fishing rod and in the open position.

DETAILED DESCRIPTION OF THE INVENTION

Figure 1:
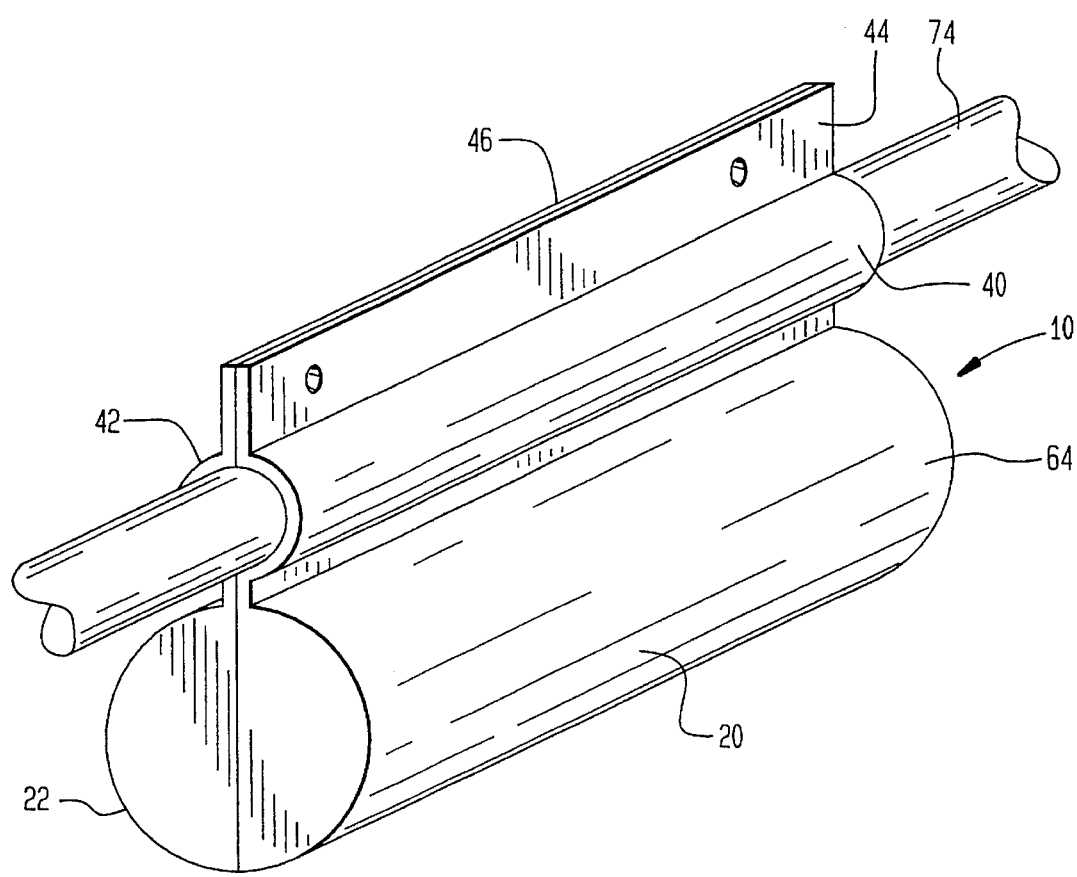
FIG. 1 is an overall perspective view of a rod mounted lure case of the present invention with the lure case shown in use mounted on a fishing rod.

With reference to the drawings, there is shown in FIGS. 1–4 a rod mounted lure case 10 which is formed as a unitary member 12 of a plastic material. The member 12 is generally rectangular and includes an integrally formed hinge 14 of the type known as a living hinge. Hinge 14 generally bisects member 12 forming two generally symmetrical portions 16, 18.

Each of portions 16, 18 includes a semi-cylindrical recess portion 20, 22, each of which include a cylindrical portion 24, 26 and a pair of semi-circular end walls 28, 30, and 32, 34. Adjacent to each of semi-cylindrical recess portions 20, 22 there is a first flange portion 36, 38 and adjacent to each of the first flange portions 36, 38 there is a semi-tubular or semi-cylindrical portion 40, 42.

A second flange portion 44, 46 is formed adjacent to the outer edges 48, 50 of the semi-tubular portions 40, 42 and a pair of locking members 52, 54, 56, 58 are formed on the second flange portions 44, 46. The locking members 52, 54, 56, 58 are best shown in FIGS. 3 and 4 and include a pair of projecting portions 52, 54, each having conical side walls 60.

Figure 3:
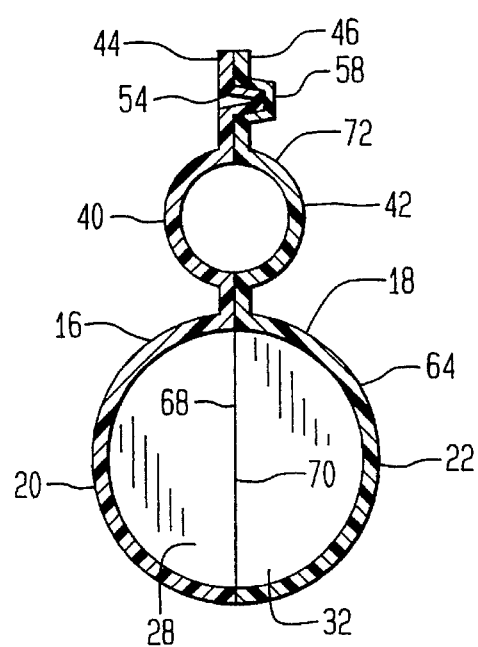
FIG. 3 is a cross-sectional view taken along line 3—3 of FIG. 2.

A pair of complementary shaped recessed portions 56, 58 are formed on the flange 46 and the recessed portions 56, 58 are each proportioned to accept and lock onto a projecting portion 52, 54 as is shown in FIG. 3.

Figure 2:
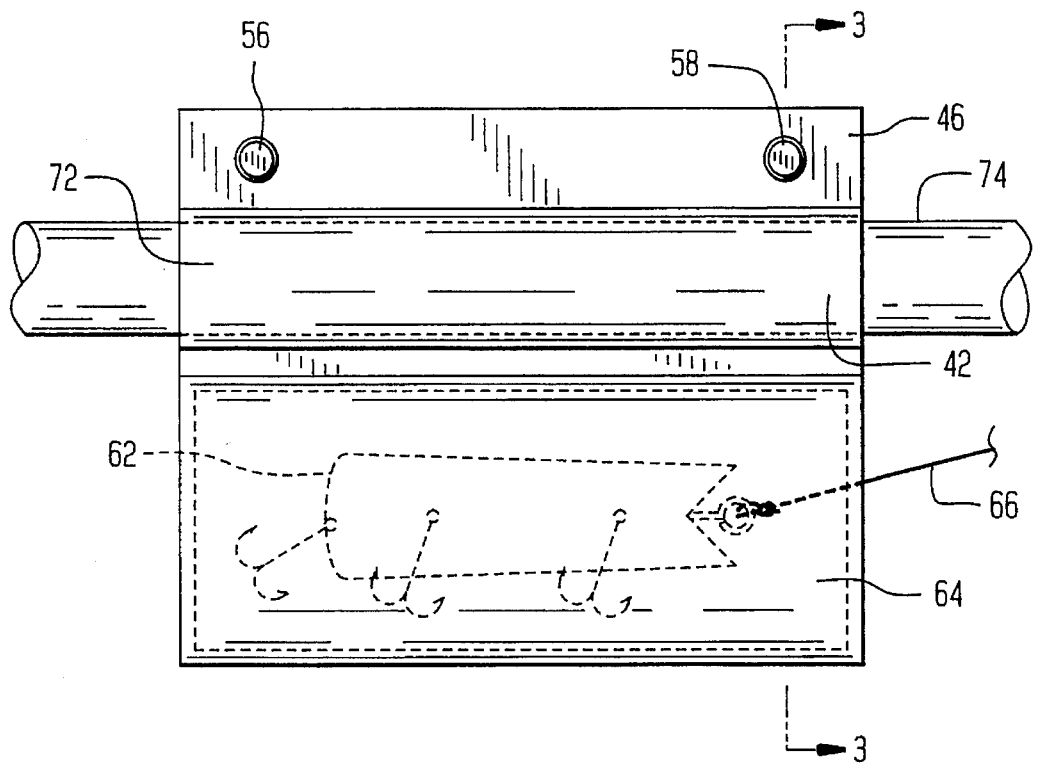
FIG. 2 is a side elevational view of the rod mounted lure case of FIG. 1 with the lure case shown in use holding a fishing lure.

During use, the two portions 16, 18 are folded together using the hinge portion 14 and the two semi-cylindrical recess portions 20, 22 are placed in a facing relationship as is shown in FIG. 3. A fishing lure 62 can be easily and safely stored in the container 64 which is formed by the two semi-cylindrical recess portions 20, 22 as is shown in FIG. 2. The fishing line 66 can exit the container 64 through the interface between the edges 68, 70 of the semi-circular end wall portions 28, 32, as shown in FIG. 3.

When the two portions 16, 18 are folded together, the two semi-tubular or semi-cylindrical portions 40, 42 form a tube portion 72, as is shown in FIG. 3. The tube portion 72 can be placed around a fishing rod 74 as is shown in FIGS. 1 and 2 and then flanges 44, 46 can be locked together using the locking members 52, 54, 56, 58 to removably lock the apparatus 10 onto the fishing rod 74.

The unitary member 12 is preferably made of a semi-rigid, thermo-plastic sheet which can be formed by a vacuum forming process. In addition, the unitary member 12 is preferably made of a transparent plastic which facilitates viewing the lure 62 which has been stored in the lure case 10, as in FIG. 2. The configuration of the rod mounted lure case 10, according to the present invention, which has been formed by combinations of simple curved surfaces and flat surfaces, allows the apparatus 10 to be cleaned and washed easily after use. The combinations of relatively simple curved and flat surfaces of the rod mounted lure case 10 enables the apparatus to be easily and economically manufactured using a vacuum forming process with relatively simple and inexpensive tooling.

The foregoing specific embodiments of the present invention, as set forth in the specification herein, are for illustrative purposes only. Various changes and modifications may be made within the spirit and scope of the invention.

I claim:

1. A rod mounted lure case comprising:
   a unitary member, said unitary member comprising:
   a first pair of recessed portions formed in said unitary member,
   hinge means formed on said unitary member and disposed between said pair of recessed portions,
   a second pair of curved portions formed, one each, adjacent to each of said first pair of recessed portions,
   a pair of flange portions disposed, one each, adjacent to each of said second pair of curved portions, and
   reversible locking means disposed on said flange portions for the purpose of reversibly locking said pair of flange members together, with said unitary member foldable along said hinge means to bring said pair of flanges together thereby bringing said first pair of recessed portions together to form a container and bringing said second pair of curved portions together to form a tubular portion.

2. A rod mounted lure case according to claim 1, in which each of said second pair of curved portions comprises a semi-cylindrically curved portion.

3. A rod mounted lure case according to claim 1, in which each of said first pair of recessed portions comprises a cylindrical wall portion and a pair of semi-circular wall portions.

4. A rod mounted lure case according to claim 1, in which said reversible locking means comprises at least one projecting portion formed in a first of said pair of flange portions and a recessed portion formed in a second of said pair of flange portions.

5. A rod mounted lure case according to claim 1, in which said unitary member is generally rectangular.

6. A rod mounted lure case according to claim 5, in which said hinge means is disposed generally bisecting said unitary member.

7. A rod mounted lure case according to claim 1, in which said hinge means comprises living hinge means.

8. A rod mounted lure case according to claim 1, in which said unitary member is made of transparent plastic.

9. A rod mounted lure case according to claim 1, in which said unitary member is made of a thermo-plastic material.

10. A rod mounted lure case according to claim 1, in which said unitary member is made of a semi-rigid plastic.

11. A rod mounted lure case according to claim 1, in which said reversible locking means comprises at least one pair of complementary shaped engaging portions.

* * * * *